United States Patent [19]

Kon et al.

[11] 4,084,016

[45] Apr. 11, 1978

[54] PREPARATION OF LEGUME CHIPS

[75] Inventors: Samuel Kon, Berkeley; Catherine J. Dunlap, Mill Valley, both of Calif.

[73] Assignee: The United States of America as represented by the Secretary of Agriculture, Washington, D.C.

[21] Appl. No.: 754,920

[22] Filed: Dec. 28, 1976

[51] Int. Cl.² ............................................... A23L 1/20
[52] U.S. Cl. ................................. 426/634; 426/550; 426/560; 426/808
[58] Field of Search ............... 426/550, 560, 634, 808, 426/388

[56] References Cited

U.S. PATENT DOCUMENTS

| 3,027,258 | 3/1962 | Markakis et al. ............... 426/560 X |
| 3,519,432 | 7/1970 | Succo et al. ............................ 426/550 |
| 3,600,193 | 8/1971 | Globe et al. .................... 426/808 X |
| 3,849,582 | 11/1974 | Blagdon et al. ................ 426/808 X |
| 3,911,142 | 10/1975 | Huelskamp et al. ............. 426/808 X |

OTHER PUBLICATIONS

Kon et al., Legume Powders; "Preparation and Some Nutritional and Physico-chemical Properties", J. Fd. Science, vol. 39, (1974), pp. 897–899.
Hafner, Edible Soy Flour and Soy Grits, The Soybean Digest, vol. 19 (1959), pp. 8–9.

*Primary Examiner*—Joseph M. Golian
*Attorney, Agent, or Firm*—M. Howard Silverstein; David G. McConnell; Theodore J. Leitereg

[57] ABSTRACT

Legume chips for use as a snack food are prepared by first mixing an acidified legume powder with regular legume powder. Water is added to the mixture to form a paste, which is extruded into thin sheets. Bite-size pieces are cut from the thin sheet and are par-fried in edible oil to obtain a desired color, texture, flavor, and moisture content.

6 Claims, No Drawings

PREPARATION OF LEGUME CHIPS

BACKGROUND OF THE INVENTION

1. Field of the Invention

This invention relates to and has among its objects the provision of novel snack items prepared from legume seeds and novel processes for making them. Further objects of the invention will be evident from the following description wherein parts and percentages are by weight unless otherwise specified.

2. Description of the Prior Art

Snack items have assumed a very prominent role in the American diet, especially for the young. Most snack items, although generally tasty, are lacking in nutrition. Potato chips, for example, are consumed in large quantities but contain only a minimal amount of protein. One means for rendering snack items more nutritious is to fortify them with protein, vitamins, minerals, and the like.

Snack items prepared from materials rich in protein are another answer to the above problem. Legume seeds contain a high percentage of protein and some water-soluble vitamins. However, utilization, in general, of legume seeds is hindered by the relatively lengthy procedures required to prepare them for consumption. It has also been difficult to prepare snack items such as chips from legume seeds. In most instances the legume seed material is very difficult to extrude, and, even if extrusion is achieved, the resulting chip is too brittle.

SUMMARY OF THE INVENTION

The invention described herein provides means for obtaining novel chip-like snack items from legume seeds. The chips of the invention are crisp, yet tender, and are pleasing to the palate.

In the process of the invention legume seed powder is mixed with water to form a paste which is extruded into thin sheets. Chips are cut from the thin sheets and are par-fried in an edible oil to a desired color, texture, flavor, and moisture level. The legume seed powder used is a mixture of two powders—whole-cell powder and broken-cell powder—prepared according to the procedure described herein below. Flavoring agents, minor proportions of cereal grains, dried potatoes, and seasonings such as salt may be mixed with the powder prior to the addition of water to further improve the flavor of the product.

An advantage of the invention is that the legume chip is not only flavorful but it also contains a high percentage of protein. Thus, good nutrition is assumed despite the fact that the instant product is a snack food item. Since the legume chip is par-fried in edible oil, it provides a good balance of protein and fat for the human diet. Further, low-fat chips can also be prepared for weight-watchers.

Another advantage of the invention is that the well-balanced nutritional snack item is ready-to-eat. Utilization of legume seeds is hindered somewhat by the lengthy procedures required to make them ready for the table. The chip of the invention is convenient in that no cooking or other preparation of the item is required of the consumer.

Another advantage of the invention is that many legume seeds which are rich in protein can now be incorporated into the human diet in a manner acceptable to most individuals. The invention has wide utility and products of the invention can be prepared from legume seeds of all types, e.g., seeds of the genus Phaseolus including common beans such as large white, small white, pinto, red kidney, cranberry, lima, etc.; the genus Pisum including smooth and wrinkled peas; the genus Vigna including the blackeye beans (or blackeye peas as they are often termed); the genus Lens including lentils; the genus Cicer including garbanzo or chick peas; the genus Soja, that is, soybeans, etc.

DESCRIPTION OF THE PREFERRED EMBODIMENTS

The primary object of the invention is the provision of novel, ready-to-eat legume products and processes for making them. Basically, the objects of the invention are attained by applying the following operations.

Legume seed powder is mixed with water in an amount sufficient to form a paste. Generally, 28 to 45% of water based on the total weight of paste is used. The powder and water are stirred until they are thoroughly mixed. The temperature of the water is generally about 60° to 75° C.

The powders which may be used in accordance with the invention are prepared primarily by two techniques. The first type of powder known as whole cell or "regular powder" is prepared according to a procedure outlined by Kon et al. in the *Journal of Food Science*, Vol. 39, pages 897–899 (1974). Briefly, legume seeds are first cooked until tender either with or without prior soaking. Beans soaked overnight are cooked for 1 hour in about 4 volumes of water, whereas unsoaked beans are cooked at least 2 hours in 5 volumes of water. The cooked beans are then formed into a slurry and the slurry is dried, preferably drum-dried, to yield a powder or flakes.

Broken cell or acidified legume powder is prepared as described in the above-mentioned article by Kon et al. Raw legumes are ground to pass a 40-mesh screen. The ground beans are added to 8 volumes of water acidified with hydrochloric acid to produce a slurry of about pH 3.5. The slurry is cooked and stirred for about 15 min. and then is neutralized by addition of alkali to pH 6–7. The so-prepared material is then dried to yield the acidified legume powder or flakes.

For purposes of the invention the above two types of legume powders must be combined in definite proportions to achieve the advantages of the invention and to obtain a final product with the best characteristics of taste, texture, and color. Usually, an excellent ready-to-eat legume product can be produced by mixing about 2 to 10 parts of acidified powder with one part of regular powder.

It is also within the compass of the invention to incorporate flavoring agents and seasoning with the powder at this time. Thus, one may mix seasoning agents such as salt, pepper and the like with the legume seed paste; in addition, flavoring agents such as garlic, barbecue flavor agents, etc., may be used. Other agents such as potato flakes or powder, cereal grain flakes or powders, e.g., corn meal, etc., may be incorporated with the legume seed powder prior to the addition of water. The amount of seasoning, flavoring, or other agents added is dependent on the desired flavor of the final product. Such amounts can easily be determined by preparing small quantities of chips for flavor evaluation and selection.

It is within the compass of the invention to mix an acidified legume powder with dried potato material, such as flakes or buds, or dry cereal grain material such as corn meal, etc., in place of regular legume powder. Usually, about 2 to 10 parts of acidified legume powder is employed per part of added material.

It is important to emphasize, however, that a combination of acidified legume powder and some other material is necessary. If regular legume powder is employed by itself the final product is brittle. Similarly, if only acidified legume powder is used the legume chips have no flavor and tend to stick to the teeth. On the other hand, when acidified legume powder is mixed in the above proportions with regular legume seed powder or with dry potato material or cereal grain material, or both, a product with excellent texture, as well as flavor, is obtained.

It is preferred, although not mandatory, to incorporate an emulsifying agent into the ingredients which form the paste. As an emulsifier one may use sodium stearyl-2-lactylate, ethoxylated monoglyceride, and the like. The amount of emulsifier used is about 0.1 to 0.5% based on the total weight of the dry powder.

The so-prepared paste is extruded into thin sheets about 1.1 to 1.7 mm in thickness. The sheets are cut into pieces approximately 3 to 6 cm. in length and 2 to 4 cm. in width. The size and the shape of the cut pieces are determined by the size and shape desired in the final product. Thus, the pieces may be cut into circles, squares, and the like. Furthermore, the pieces can be formed into scoops or other shapes convenient for using the chips with dip.

The pieces of extruded paste are next par-fried in an edible oil to develop the desired flavor, color, and texture, and to reduce the moisture level of the piece. Generally, excellent results are obtained by par-frying in oil for a period of about 10 to 20 seconds at a temperature of about 185° to 195° C. The moisture content of the par-fried chip is about 1 to 2% and the content of fat is about 20 to 22%. The desired color is usually golden brown.

A legume chip with a lower fat content can be produced by first exposing the extruded pieces to heat, such as infrared heat or hot air, to partially dehydrate them. Then, the so-treated pieces can be par-fried in oil for shorter times to obtain a product with the proper color, texture, flavor, and moisture level, but with less fat. Non-fat chips can also be prepared by dehydrating the piece with heat and avoiding the frying step.

The products of the invention are crisp, yet tender, with a flavor and texture equal to or better than conventional potato and other chips. Furthermore, the ready-to-eat legume products are firm and are useful as carriers for dips, pastes, and spreads where their firm character allows plentiful quantities of the dip, paste or spread to be scooped up and consumed herewith. The instant products are not chewy and do not stick to the teeth of the consumer.

EXAMPLES

The invention is further demonstrated by the following illustrative examples.

EXAMPLE 1

Acidified pinto bean powder (7.5 kg.), prepared according to the procedure of Kon et al. described in the aforementioned article in the Journal of Food Science, was mixed with 2.5 kg. of regular pinto bean powder, prepared by procedures described in the same article. To the mixture of powders was added Emplex (Sodium stearoyl-2-lactylate, an emulsifier produced by Patco Products a division of C. J. Paterson of Kansas City, Missouri) until its concentration therein was 0.25%. Then, 9.5 l. of water at 65° C. was added to the above mixture. The ingredients were mixed thoroughly for about 30 min. to form a paste, which was extruded into a sheet 1.2 mm. thick. Rectangular chips about 5 cm. long and 3 cm. wide were cut from the extruded sheet and were deep fried in vegetable oil at 170° C. for 25 seconds.

The product was crisp, but tender, and firm and did not stick to the teeth. Judges, trained in the art of food tasting, compared the instant legume chips to conventional potato chips. The chips of the invention were rated higher in flavor and texture.

EXAMPLE 2

Acidified lima bean powder (750 g.) prepared as in Example 1 was mixed with 250 g. of regular California small white bean powder and 20 g. of sodium chloride. Emplex was added to this mixture at a concentration of 0.5% based on the total weight of bean powder. To this mixture was added 400 ml. of water at 65° C. This material was treated as described in Example 1 except that par-frying was at 190° C. for 15 seconds.

The product exhibited excellent texture and flavor superior to a potato chip as determined by a panel of judges as in Example 1.

EXAMPLE 3

The procedure described in Example 2 was followed with the following changes: 740 g. of acidified lima bean powder was mixed with 150 g. of dry potato flakes and 90 g. of white corn meal and 20 g. of sodium chloride.

The par-fried legume chips were light in color, crisp and tender, did not stick to the teeth nor puff during frying, and had a pleasing flavor. These chips were also rated better with respect to flavor and texture than conventional potato chips by a panel of trained judges.

Having thus described our invention, we claim:

1. A process for preparing ready-to-eat legume products, which comprises
   (a) combining 2 to 10 parts of cooked, acidified broken cell legume powder with one part of cooked whole cell legume powder,
   (b) adding water at a temperature of about 60° to 75° C. to the so-combined powders to form a paste, said water being added in an amount of 28 to 45%, based on the weight of the paste,
   (c) extruding the paste into thin sheets,
   (d) cutting the sheets into pieces, and
   (e) par-frying the pieces in edible oil.

2. The process of claim 1 wherein an emulsifier is mixed with the legume powder in Step a in an amount of about 0.1 to 0.5% based on the total weight of legume powder.

3. The process of claim 2 wherein the emulsifier is sodium stearyl-2-lactylate.

4. The process of claim 1 wherein heat is applied to the pieces to reduce the moisture content thereof prior to par-frying in edible oil.

5. The process of claim 1 wherein the pieces are par-fried in oil at a temperature of about 185° to 195° C. for a period of about 10 to 20 seconds.

6. A ready-to-eat legume product produced by the process of claim 1.

* * * * *